United States Patent [19]

Tadros

[11] Patent Number: 4,664,738

[45] Date of Patent: May 12, 1987

[54] PROCESS FOR LAMINATING FILM TO WOVEN FABRIC

[75] Inventor: Safwat E. Tadros, Claymont, Del.

[73] Assignee: E. I. Du Pont de Nemours and Company, Wilmington, Del.

[21] Appl. No.: 761,670

[22] Filed: Aug. 1, 1985

Related U.S. Application Data

[63] Continuation of Ser. No. 613,411, May 24, 1984, abandoned.

[51] Int. Cl.$^4$ .................... B32B 31/12; B32B 31/20
[52] U.S. Cl. .................... 156/275.1; 156/176; 156/272.2; 156/272.4; 156/285; 156/290; 156/308.4
[58] Field of Search .................... 156/163, 176, 272.2, 156/272.4, 275.1, 285, 287, 290, 308.2, 308.4, 308.6, 309.6

[56] References Cited

U.S. PATENT DOCUMENTS

| | | | |
|---|---|---|---|
| 3,072,512 | 1/1963 | Dalle | 154/46 |
| 3,247,041 | 4/1966 | Henderson | 156/272 |
| 3,310,453 | 3/1967 | Lappala et al. | 161/49 |
| 4,109,543 | 8/1978 | Foti | 156/309.6 |
| 4,119,481 | 10/1978 | Beckley | 156/272 |
| 4,138,303 | 2/1979 | Taylor, Sr. | 156/285 |
| 4,402,785 | 9/1983 | Withers | 156/499 |

Primary Examiner—Donald E. Czala
Assistant Examiner—Merrell C. Cashion, Jr.

[57] ABSTRACT

Lamination of film to woven fiber is achieved by localized infrared heating to heat directly onto the fibers, which in turn cause the covering film to soften and bond only in the area contacting the fibers.

2 Claims, No Drawings

PROCESS FOR LAMINATING FILM TO WOVEN FABRIC

This application is a continuation of application Ser. No. 613,411, filed May 24, 1984, now abandoned.

BACKGROUND

The lamination of thermoplastic films to substrates such as woven fabric is well known. The film provides a protective surface over the fabric, imparts water resistance, weatherability resistance, and the like.

Ordinarily the film is heated until it softens whereupon, in its softened state, it adheres to the fibers in the fabric or to an adhesive coating on the fibers to form a bonded laminate. A disadvantage however occurs in that when the film is heated to the softening point, it sags into the weave interstices and forms an uneven layer over the woven fabric. This is disadvantageous for products where a smooth surface or high light transmission is desirable, and it is disadvantageous for other products where good reflectability of light is desired.

It would be desirable to provide a process for bonding thermoplastic film to woven fabric whereby the film will not sag into the interstices of the woven fabric, yet will result in a strong bond at the points of film-fiber contact.

This invention provides such a process.

SUMMARY OF THE INVENTION

Specifically, this invention provides a process for laminating a thermoplastic film to woven fabric in which the fabric fibers are infrared wave-length absorbing, or are covered with infrared wave-length absorbing material which comprises a. positioning thermoplastic film which transmits infrared radiation without being substantially heated thereby over and in contact with said woven fabric, b. subjecting the positioned film and fabric composition to infrared radiation from a radiation source in a manner which maintains the film between the fabric and the radiation source, c. maintaining the radiation provided in step b until the fibers, or the coating on the fibers, as the case may be, soften at a temperature between the softening temperature of the thermoplastic film and the heat distortion temperature of the film, d. cooling the film-woven fabric composition while maintaining said contact.

By heating the fibers, or the coating on the fibers, which fibers or coating have a high heat distortion temperature and absorb infrared radiation, and not the film which transmits infrared radiation, the film softens only in those areas in contact with the heated fibers or coating. The softened area then bonds to the fibers or coating. The localized selective heating of only these areas of the film that contact the fibers or coating results in a film surface over the fabric that maintains its integrity, i.e., the film, because it is not heated to its softening point at any other portions, does not sag into the interstices of the weave of the glass fibers. Nor, if it is an oriented film, does it become unoriented in those other portions.

Preferably, the film will be a melt-extrudable tetrafluoroethylene copolymer, and most preferably a transparent one (to provide good light transmission). An advantageous copolymer of this type is a copolymer of 80% to 95% by weight tetrafluoroethylene and 5–20% by weight hexafluoropropylene, which may contain minor amounts of other polymerizable comonomers, these may be prepared as described in Bro et al., U.S. Pat. No. 2,946,763.

Preferably also the woven fabric will have an open weave, as opposed to a tight or closely woven weave, and most preferably will be a glass fabric.

The laminates are useful in applications where fabric protected by the film is used as a roofing or window material.

DETAILED DESCRIPTION OF THE INVENTION

Any woven fabric made from fibers may be used so long as the fiber is constituted to withstand deformation by heat at the distortion temperature of the copolymer used in the film, and so long as the fiber absorbs infrared radiation and becomes heated as a result of such absorption. A preferred fabric is glass fabric, other fabrics include polyesters, polyimides, aramids, and the like.

The thermoplastic film can be any thermoplastic film so long as it is essentially transparent to, i.e., pervious to or unaffected by, infrared radiation and does not become substantially heated upon being subjected to infrared radiation. Vinyl and condensation polymers can be used, such as polyethylene, polyethylene terephthalate, polyvinyl fluoride, polychlorotrifluoroalkylene and the like. Preferably, the film will be a melt-processible copolymer of tetrafluoroethylene and an ethylenically unsaturated fluorinated comonomer, such as, a perfluoroalkyl trifluoroethylene, perfluoroalkoxy trifluoroethylene or perfluoroalkyl ethylene. The copolymers ordinarily have melt viscosities below 10 poise as measured in U.S. Pat. No. 4,380,018, Khan et al. at column 4, lines 38–52. The film may be an oriented film or an as cast film.

A high temperature heat source of 400° F.–6000° F. (204° C.–3316° C.) and/or a peak electromagnetic wavelength of between 0.25 to 10 m may be used as the infrared source. The exact peak range desired will depend on the film. For example, for tetrafluoroethylene/hexafluoropropylene copolymers the peak range should be 0.6 to 3.7 m. Unwanted wavelengths may be filtered out. For most films, infrared laser systems and/or thermal radiation high temperature radiant heaters can be used, as well as any other efficient source which will emit a narrow range of wavelengths that are highly transmitted through the film and are absorbed by the woven fabric.

Several means can be used to maintain the film in contact with the fabric. For example, a vacuum can be applied to one side of the film/fabric construction, or pressure, as from a transparent fluid such as air, can be used. Additionally the pressure induced from the tension of the film on the outer layer of a lamination roll can be used. Use of tension avoids wrinkles in the film.

External cooling may be used to control the temperature of the film. This keeps the heated portions of the film localized to the contact points with the fabric. A cool transparent fluid, such as air, may be directed onto the film.

The process can be used for batch and/or continuous bonding. The process can be used for bonding as cast and oriented films. By achieving suitable bonding of film on both sides of fabric, a product having dead air space can be obtained for use as an improved thermal insulation. In the case of thin oriented films higher heating rates and shorter times are employed to achieve melt bonding with minimum loss of orientation. This can be done by preheating, the use of high flux density of focused and/or parallel radiation, by improving the surface absorptivity of the glass fabric, and by reducing heat loss due to conduction in the fabric by using a suitable coating composition for insulation at the junction surfaces. In addition the surface of the film can be cooled by a transparent fluid by convection and/or by a transparent body by conduction to control penetration and minimize loss of orientation.

The film covered fabric prepared by the process of this invention can be used in applications such as architectural constructions, e.g., roofing, in polymeric heat exchangers, in packaging, in laminations, and in electronic, automotive, or toy applications.

An advantage of the process of this invention is that films remain flat over the substrate surface without wrinkling, forming pin holes or protruding into the weave interstices.

EXAMPLES

In the Examples, the thermal radiant source used was a GE Quartz Infrared Lamp type QH 1200 T3/CL 144V having a tungsten filament as an emitter in Argon atmosphere. The emitter operated at approximately 4000° F. (2204° C.) at rated and 5400° F. (2982° C.) at twice rated voltage, with 1.1 and 0.85 m spectral energy peak respectively. Specifically, the experiments were conducted using parallel radiation source type RI 5305-5A and/or focused radiation source type RI 5193-5, where RI stands for Research Incorporated.

The film used in the Examples was a film of a copolymer of tetrafluoroethylene and hexafluoropropylene (88/12).

The fabric used in the Examples was a woven glass fabric having leno weave style 1590 (5 windows per inch) in which the fabric fibers were coated with a coating of silicone lubricant, ET-4327, polytetrafluoroethylene (Du Pont T-3313) and a topcoat of the copolymer described in the preceding paragraph.

EXAMPLE 1

Lamination was carried by placing a 5 mil cast film over and in contact with the woven glass fabric and passing the layered composite between the radiant energy source described above and an aluminum radiant energy reflector. To aid in maintaining contact between the film and fibers a vacuum was applied to the side of the composite adjacent the reflector.

Lamination of film onto one side of the coated glass fabric was made at the following conditions:
Lamp Volts: 130.
Vacuum in cm $H_2O$: 2.54 cm.
Surface cooling: none.
Speed, in/min: 7.85–9.42 (0.332–0.339 cm/sec).

Two parallel radiation sources were used; which were RI 5305-5A.

Solar transmission (measured by ASTM E-424) gave a maximum of 72.5% and thermal conductivity was 0.412 W/m²K (about half that of glass) as measured by ASTM C177.

To test for leaks and delamination, a 7.62 cm diameter laminated fabric sample was clamped between two ¼" (0.635 cm) neoprene gaskets such that air pressure could be applied on the fabric side. When testing for leaks due to pin holes, an ~½" (1.3 cm) water layer on the film side was used to monitor for air bubbles at 36" (91.44 cm) of water pressure. When testing for delamination, the air pressure was increased to ~35 psi (2.5 kg/cm²) and the sample was examined for film fabric bond delamination. No leaks or delamination were observed.

EXAMPLE 2

Using the procedure of Example I, except adding an air surface coolant, lamination of 5 mil (0.0127 cm) cast film onto one side of the coated glass fabric was made at the following conditions:
Lamp Volts: 240.
Vacuum in cm $H_2O$: 15.
Surface cooling air knife pressure psi: 20 (0.14 MPa) and down stream of source.
Speed in/min: 6 (0.254 cm/sec).

One focused radiation source RI 5193-5 was used. The sample has no pin holes at an air pressure equivalent to 36" $H_2O$ (91.44 cm). It began to leak at 15 psi (0.05 kg/cm²) testing pressure but no delamination occurred up to 35 psi (2.46 kg/cm²).

EXAMPLE 3

Using the procedure of Example 2, lamination of two 5 mil (0.0127 cm) cast films on each fabric side provided a dead air space, for thermal insulation. Lamination was made at the following conditions:
Lamp Volts: 240.
Vacuum cm $H_2O$: 6–8 (15.2–20.3 cm).
Cooling air Pressure psi: 8 (0.56 kg/cm²).
Speed in/min: 10–12 (5–6 cm/sec).

The infrared radiation source consisted of RI 5306-5A for pre-heating followed by RI 5193-5 for fusing.

Solar transmission (ASTM E-424) gave a maximum of 72.6% and thermal conductivity was 0.075 W/m²K, about 10 times lower than glass. There were no pinholes and/or delamination.

EXAMPLE 4

Lamination of single and double layer film structures were made on a continuous lamination process. In continuous lamination, a roll of the film(s) and a roll of the fabric converge and are held in contact, as the composite is passed over a reflector roll while being subjected to the radiant energy source. The conditions were as follow:

|  | Single | Double |
| --- | --- | --- |
| Lamp Volts: | | |
| RI 5305-5A | 140 | 140 |
| RI 5193-5 | 240 | 240 |
| Cooling air pressure Kg/cm² | 0.703 | 0.703 |
| Speed cm/sec | 0.508 | 0.423 |
| Reflector roll temp., °C. | 84° C. | 84° C. |

The same film and fabric were used as before. There was no need to use vacuum to ensure contact between film and fabric. Tension of outer film on the lamination roll is suitable to achieve good bonding. There were no pinholes or delamination.

EXAMPLE 5

Using the procedure of Example 2, lamination by bonding of 5 mil (1.30 μm) oriented film (stretch ratio 3.5×) onto one side of glass fabric coated with a copolymer of tetrafluoroethylene and hexafluoropropylene (1.22 Sp.Gr.) containing 2 wt % carbon black, as in Example 4 was made at the following conditions:

|  | Example 5a | Example 5b | Example 5c |
| --- | --- | --- | --- |
| Topcoat % carbon black | 2% | 5% | 8% |
| RI 5193-5 lamp volts | 240 | 240 | 240 |
| Speed cm/sec | 1.02 | 1.27 | 1.52 |
| Cooling air pressure Kg/cm$^2$ | 2.39 | 2.39 | 2.39 |
| Vacuum in cm H$_2$O | 50.8 | 50.8 | 50.8 |

All samples had good bonding and were free of pin holes.

I claim:

1. Process for laminating a thermoplastic film to woven fabric to provide a flat covering over the woven fabric in which the fabric fibers are infrared wavelength absorbing, or are covered with an infrared wavelength absorbing material, which comprises
   a. positioning a thermoplastic film of a copolymer of 80–95 weight % of tetrafluoroethylene and 5–20 weight % hexafluoropropylene, which may contain minor amounts of other polymerizable comonomers and which transmits infrared radiation without being substantially heated thereby, over and in contact with an open weave woven glass fabric that contains interstices between the woven fibers and in which the fibers of the fabric are coated with a copolymer of tetrafluoroethylene and hexafluoropropylene,
   b. subjecting the positioned film and glass fabric to infrared radiation from a radiation source in a manner and for a time sufficient to soften the copolymer coating on the fibers,
   c. maintaining the radiation provided in step b until the film softens where it contacts the coated fibers but not until those portions of the film that cover said interstices soften, thereby preventing said film from sagging into said interstices, said contact being maintained by (1) applying vacuum to one side of the film and glass fabric, or (2) the pressure of the film against the fabric caused by the pull of the wind up lamination roll,
   d. cooling the film-woven fabric composition while maintaining said contact.

2. The process of claim 1 wherein the glass fabric absorbs electromagnetic radiation in the wavelength range of 0.25 to 10 μm and the film is substantially transparent to wavelengths in this range.

* * * * *